United States Patent
Lee et al.

(10) Patent No.: US 7,403,494 B2
(45) Date of Patent: Jul. 22, 2008

(54) METHOD FOR GENERATING NODES IN MULTIWAY SEARCH TREE AND SEARCH METHOD USING THE SAME

(75) Inventors: Kang-Bok Lee, Chungcheongbuk-do (KR); Sang-Woo Lee, Taejon (KR); Heyung-Sub Lee, Taejon (KR); Hyeong-Ho Lee, Taejon (KR)

(73) Assignee: Electronics and Telecommunications Research Institute (KR)

( * ) Notice: Subject to any disclaimer, the term of this patent is extended or adjusted under 35 U.S.C. 154(b) by 1187 days.

(21) Appl. No.: 10/038,923

(22) Filed: Dec. 31, 2001

(65) Prior Publication Data
US 2003/0123397 A1  Jul. 3, 2003

(30) Foreign Application Priority Data
Dec. 30, 2000  (KR) ............................... 2000-87576

(51) Int. Cl.
H04L 12/28  (2006.01)
G06F 7/00  (2006.01)
G06F 15/173  (2006.01)
H04L 12/66  (2006.01)
(52) U.S. Cl. .................. 370/256; 370/392; 370/395.32; 370/408; 707/3; 709/238
(58) Field of Classification Search ................. 370/392, 370/231; 709/241; 707/3
See application file for complete search history.

(56) References Cited

U.S. PATENT DOCUMENTS 4,677,550 A  6/1987  Ferguson .................... 364/300
5,664,184 A * 9/1997  Ferguson et al. ........ 707/103 R
5,752,184 A * 5/1998  Ishimura ..................... 455/352
5,848,416 A * 12/1998  Tikkanen .................... 707/101

(Continued)

FOREIGN PATENT DOCUMENTS

KR  000039983  7/2000

(Continued)

OTHER PUBLICATIONS

IEEE Journal on Selected Areas in Communications, vol. 17, No. 6, Jun. 1999, 10 pages.

(Continued)

*Primary Examiner*—Melanie Jagannathan
(74) *Attorney, Agent, or Firm*—Blakely, Sokoloff, Taylor & Zafman

(57) ABSTRACT

A node structure of a multiway search tree can accelerates a search speed by making a key, a key pointer and a node pointer coincident with the size of a cache line through the use of only one pointer written on a node regardless of the number of keys used in the node and, thereafter, reduce the main memory capacity, a search method using the node structure and a computer readable recording medium in which a program implementing the search method is recorded. The method for generating nodes of a multiway search tree includes the steps of: a) assigning at least one key to each of the nodes; and b) assigning pointer information so that related information written on the node is accommodated in a cache line regardless a number of keys.

5 Claims, 8 Drawing Sheets

U.S. PATENT DOCUMENTS

| | | | |
|---|---|---|---|
| 6,480,839 B1 * | 11/2002 | Whittington et al. | 707/3 |
| 6,522,632 B1 * | 2/2003 | Waters et al. | 370/254 |
| 6,553,002 B1 * | 4/2003 | Bremer et al. | 370/254 |
| 6,567,815 B1 * | 5/2003 | Rubin et al. | 707/101 |
| 6,675,163 B1 * | 1/2004 | Bass et al. | 707/6 |
| 6,691,218 B2 * | 2/2004 | Brown | 711/216 |
| 6,711,027 B2 * | 3/2004 | McCall et al. | 361/783 |
| 6,711,562 B1 * | 3/2004 | Ross et al. | 707/3 |
| 7,031,314 B2 * | 4/2006 | Craig et al. | 370/392 |

FOREIGN PATENT DOCUMENTS

| | | |
|---|---|---|
| KR | 010064226 | 7/2001 |

OTHER PUBLICATIONS

IEEE/ACM Transactions on Networking, vol. 7, No. 3, Jun. 1999, 11 pages.

* cited by examiner

METHOD FOR GENERATING NODES IN MULTIWAY SEARCH TREE AND SEARCH METHOD USING THE SAME

FIELD OF THE INVENTION

The present invention relates to a method for generating nodes in a multiway search tree and a search method using the same; and, more particularly, to a method for generating a node structure of a multiway search tree and a search method for accelerating its search speed by reducing a depth of the multiway search tree and a computer readable recording medium in which a program implementing the search method is recorded.

DESCRIPTION OF RELATED ART

Referring to FIG. 1, there is illustrated a structure of a typical giga-bit routing system, which includes an interface 14 for switching a packet between a data type to be used inside the system and a data type to be used in a link.

A forwarding engine (FE) 13 for forwarding the packet classifies and assembles a received packet. That is, the forwarding engine 13 finds out a destination of the packet and determines through which link the packet should be outputted.

A switching fabric 12 practically provides data onto a link based on information determined at the forwarding engine 13.

A control processing unit (CPU) 11, which is responsible for controlling a whole routing system, performs a routing protocol.

As address search methods, there are an exact match and a longest prefix match (LPM) according to how an address is used. The exact match is used in case all bits of an address consist with each other like an Ethernet medium access control (MAC) address. On the other hand, the longest prefix match finds out a node that has the longest bits, starting from the first bit, coincident with a desired key, and, thus, is used in Internet Protocol version 4 (Ipv4).

Hereinafter, the LPM will be described in more detail. It is assumed that the IP address of the inputted arrival packet is '1010101010'. If the LPM is used for finding out consistent data, the data of which the longest bits are coincident with the input data is selected in the data structure. For example, if there are three candidates, '1011111111', '1010111111' and '1010101011', '1010101011', which is the most consistent data with the input data (left side 8 bits are identical to those of the input data), is selected.

Since, however, the longest prefix match finds out the node which is substantially coincident with a comparison object, the searched node is deep so that it takes a long time for searching the node. In order to overcome the above drawback, a Patricia tree has been widely used.

Referring to FIG. 2, there is shown a general binary tree, which is constituted by allocating a smaller value to a left side 203 of a tree and a larger value to a right side 205 of the tree by using a root node 201 as a reference. Meanwhile, FIG. 3 provides a Patricia tree derived from the Binary tree in FIG. 2.

The structure mentioned above is a general data structure for storing strings, each of the strings is represented by a leaf in the data structure, and the string value is a path from the root node to the leaf node in the tree.

Referring to the binary tree in FIG. 2, a smaller value than the parent node is allocated to a left child node (branch node), and a larger value than the parent node to a right child node.

The binary tree is constructed by following a tree according to a bit value of a key, i.e., 0 or 1, starting from the root node until reaching a leaf node. A node met at the end of this process is a node having information consistent with the desired key.

However, in case of the Binary tree, since nodes should be accessed as many as a length of a key, there is a problem in which a path length becomes longer. Therefore, there have been introduced several methods to reduce the path length of the Binary tree.

FIG. 3 is a structure of a Patricia tree performing a path compression for the Binary tree in FIG. 2.

Referring to FIG. 3, the Patricia tree described in FIG. 3 compresses a path in which nodes 207 and 209 having one node are skipped so as to reduce the path length and a skip value informing the number of skipped nodes is stored.

In other words, "2" of "skip=2,010" in FIG. 3 means that two nodes having one child are skipped. "010" of "skip=2, 010" means that the first node 207 of the skipped nodes is located at the left side (0) of the node P3 from which the skip is started, the second node 209 of the skipped nodes is located at the right side (1) of the first skipped node 207, and the leaf node P2 is located at the right side (1) of the second skipped node.

FIG. 4 is a diagram of a level compression result for the typical Binary tree.

Referring to FIG. 4, a level compression for the Binary tree compresses the depth of the tree. For the level compression, the number of child nodes is increased. In other words, in the binary tree, the maximum number of the child node is 2, however, in the level compression tree, the number of the child nodes is increased and "branching factor" representing the depth compressed is stored. For example, "branching factor=3" in FIG. 4 represents that the binary tree having a depth 3 is compressed.

Unlike the node compression, as illustrated in FIG. 5, Lampson applies a multiway search tree to an Internet protocol requiring the longest prefix match.

FIG. 5 shows a multiway search tree having 32 bytes of cache lines. Each node consists of keys K1, K2, ..., pointers P0, P1, P2, ..., and key pointers PK1, PK2, ..., wherein each node is composed of 32 bytes.

Lampson uses the multiway search tree so as to maximally utilize a hierarchical memory structure typically employed in modern processors. That is, in order to overcome a difference between a deepening memory speed and a processor speed, a cache having bigger capacity is getting embodied in the processor. According to the operation of the cache, when an arbitrary memory address is accessed, all of cache lines including the memory address are copied onto the cache of the processor at a time and data included in the cache are processed in the processor speed. Therefore, when each node of the multiway search tree is made in the size of one cache line, the number of branches can be substantially increased without using an additional main memory.

Since the multiway search tree is designed by considering a hierarchical memory structure of a disc and a main memory, a disc block provided at a time from the disc to the main memory is used by regarding a low-speed memory and a relatively high-speed main memory. Accordingly, the number of branches should be increased depending on the speed of the main memory without accessing an additional low-speed disc and representative multiway search trees are B-tree and its varied trees.

Referring to FIG. 6, there is provided a tree structure of typical B-tree.

Referring to FIG. 6, the B-tree is derived by modifying the Binary tree and usually used in a search algorithm. Namely, like the Binary tree, the B-tree classifies values onto right and left according to their sizes after comparing the values with the root node, whereas, in a next node, the B-tree compares several values at a time according to their sizes so that it can accelerate the search speed and reduce the depth of the tree.

However, in a general case of using the B-tree, the B-tree is also used to construct an index file stored in the disc so as to access a database stored in the disc and the key for accessing the database is configured with a sequence of words so that much more memories are occupied compared with a length of a pointer indicating a next node which will be connected according to a comparison result at a current node.

SUMMARY OF THE INVENTION

It is, therefore, an object of the present invention to provide a method for structuring a multiway search tree capable of accelerating a search speed by making a key, a key pointer and a node pointer coincident with the size of a cache line through the use of only one pointer written on a node regardless of the number of keys used in the node.

It is another object of the present invention to provide a computer readable medium storing instructions for implementing a method for structuring a multiway search tree capable of accelerating a search speed by making a key, a key pointer and a node pointer coincident with the size of a cache line through the use of only one pointer written on a node regardless of the number of keys used in the node.

It is another object of the present invention to provide a method for searching a multiway search tree capable of accelerating a search speed by making related information (a key, a key pointer and a node pointer) coincident with the size of a cache line through the use of only one pointer written on a node regardless of the number of keys used in the node, thereby reducing the main memory capacity.

It is another object of the present invention to provide a computer readable recording medium storing instructions for implementing a method for searching a multiway search tree capable of accelerating a search speed by making related information (a key, a key pointer and a node pointer) coincident with the size of a cache line through the use of only one pointer written on a node regardless of the number of keys used in the node, thereby reducing the main memory capacity.

In accordance with an aspect of the present invention, there is provided a method for generating nodes of a multiway search tree, comprising the steps of: a) assigning at least one key to each of the nodes; and b) assigning pointer information so that related information written on the node is accommodated in a cache line regardless a number of keys.

In accordance with another aspect of the present invention, there is provided a method for searching a multiway search tree in which pointer information is assigned to so as to accommodate related information in a cache line regardless of a number of keys used in each node, the method comprising the steps of: a) comparing an inputted IP address with a key value; b) if the inputted IP address is consistent with the key value, searching an outgoing interface by using a key pointer included in the node; c) if the inputted IP address is not consistent with the key value, determining a type of the node by searching a node pointer; d) if the node is a leaf node, searching the outgoing interface by acquiring the key pointer after monitoring where the consistency occurs; and e) if the node is not the leaf node, moving to a next node with reference to the node pointer, and then repeating the steps of a) to c).

In accordance with further another aspect of the present invention, there is provided a computer readable recording medium storing instructions for executing a method for generating nodes of a multiway search tree, the method comprising the steps of: a) assigning at least one key to each of the nodes; and b) assigning pointer information so that related information written on the node is accommodated in a cache line regardless a number of keys.

In accordance with still another aspect of the present invention, there is provided a computer readable recording medium storing instructions for executing a method for searching a multiway search tree in which pointer information is assigned to so as to accommodate related information in a cache line regardless of a number of keys used in each node, the method comprising the steps of: a) comparing an inputted IP address with a key value; b) if the inputted IP address is consistent with the key value, searching an outgoing interface by using a key pointer included in the node; c) if the inputted IP address is not consistent with the key value, determining a type of the node by searching a node pointer; d) if the node is a leaf node, searching the outgoing interface by acquiring the key pointer after noticing where the consistency occurs; and e) if the node is not the leaf node, moving to a next node with reference to the node pointer, and then repeating the steps of a) to c).

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, with reference to the drawings, some of the preferred embodiments of the present invention will be explained in detail.

Figure 1:
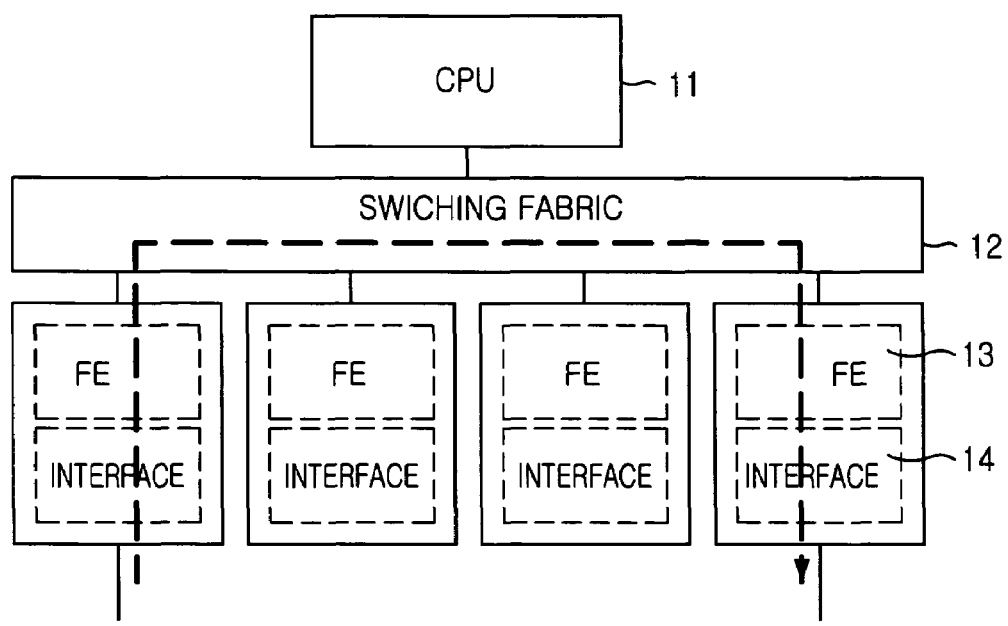
FIG. 1 shows a typical giga-bit router.
Figure 2:
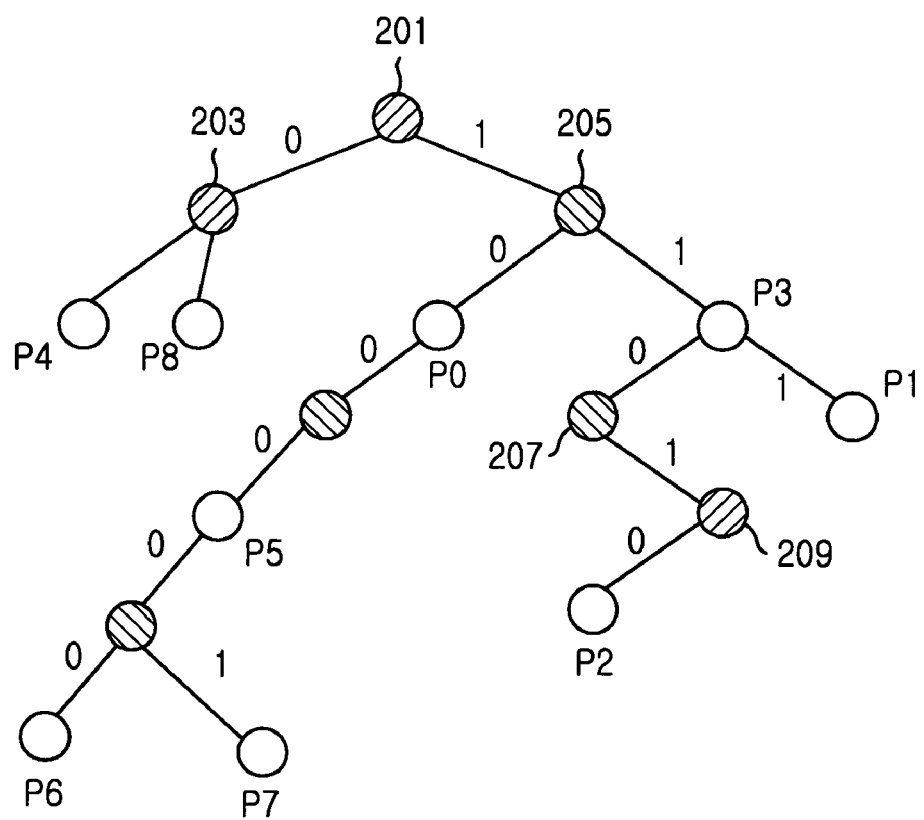
FIG. 2 illustrates a structure of a typical Binary tree.
Figure 3:
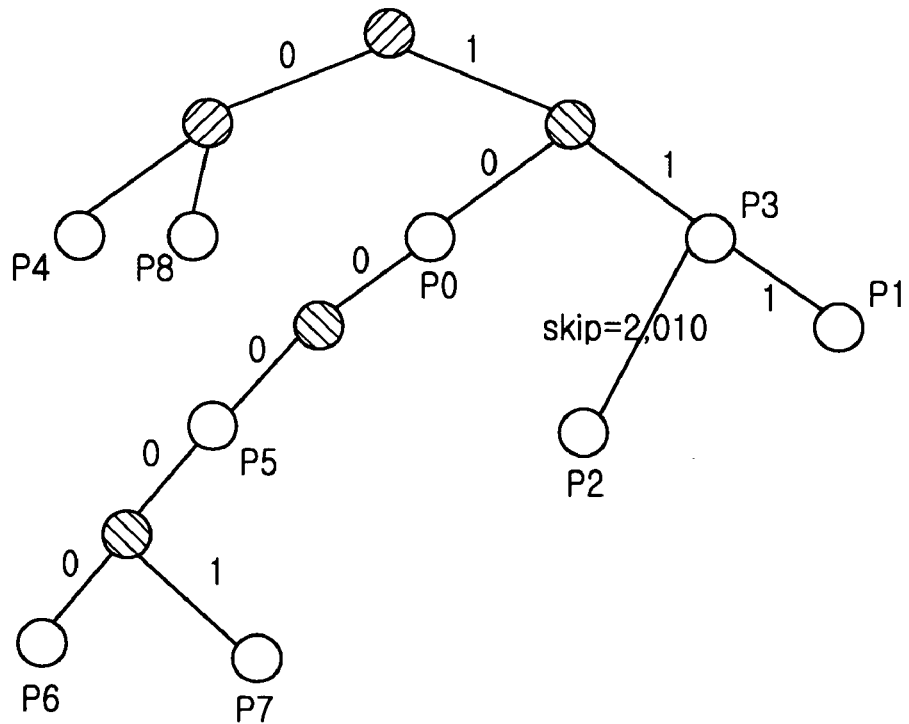
FIG. 3 is a structure of a Patricia tree performing a path compression for the Binary tree in FIG. 2.
Figure 4:
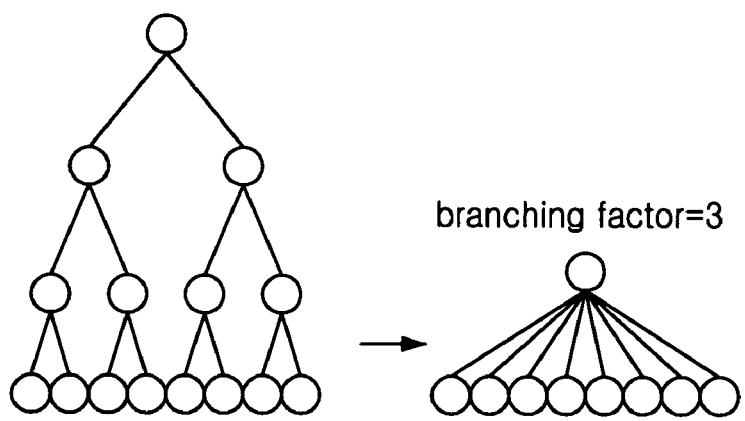
FIG. 4 provides a level compression result for the typical Binary tree.
Figure 5:
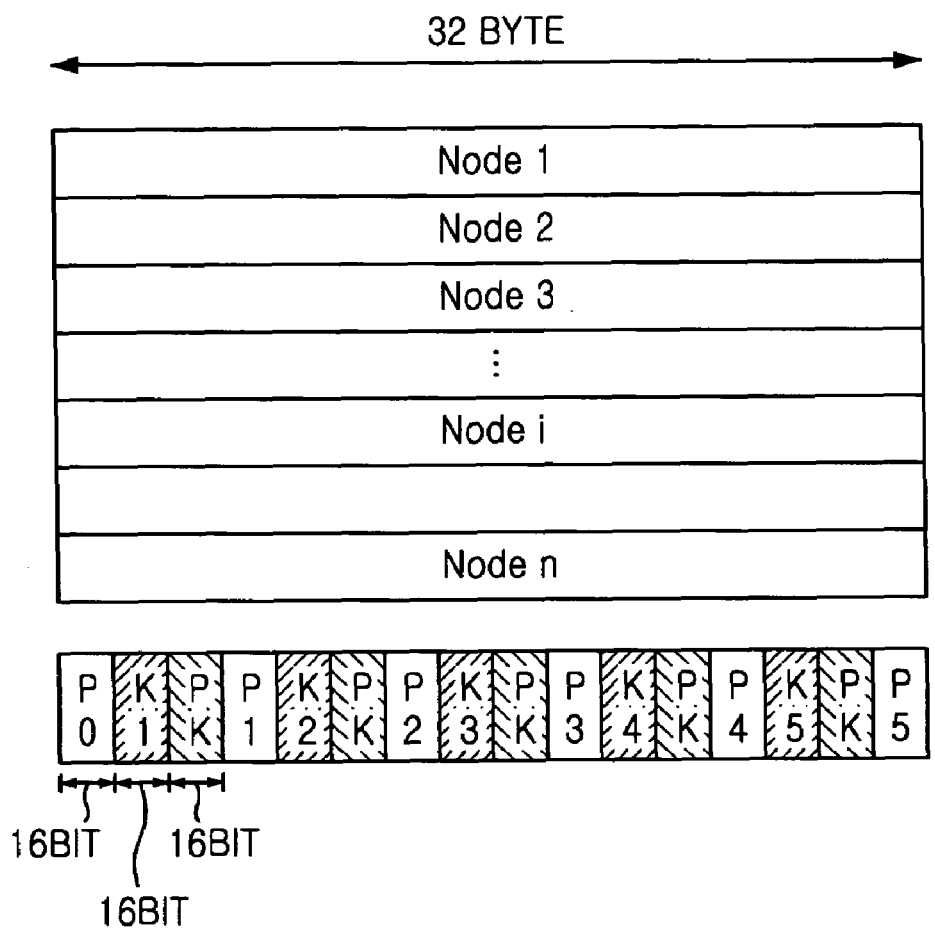
FIG. 5 depicts a tree structure depending on a typical cache line.
Figure 6:
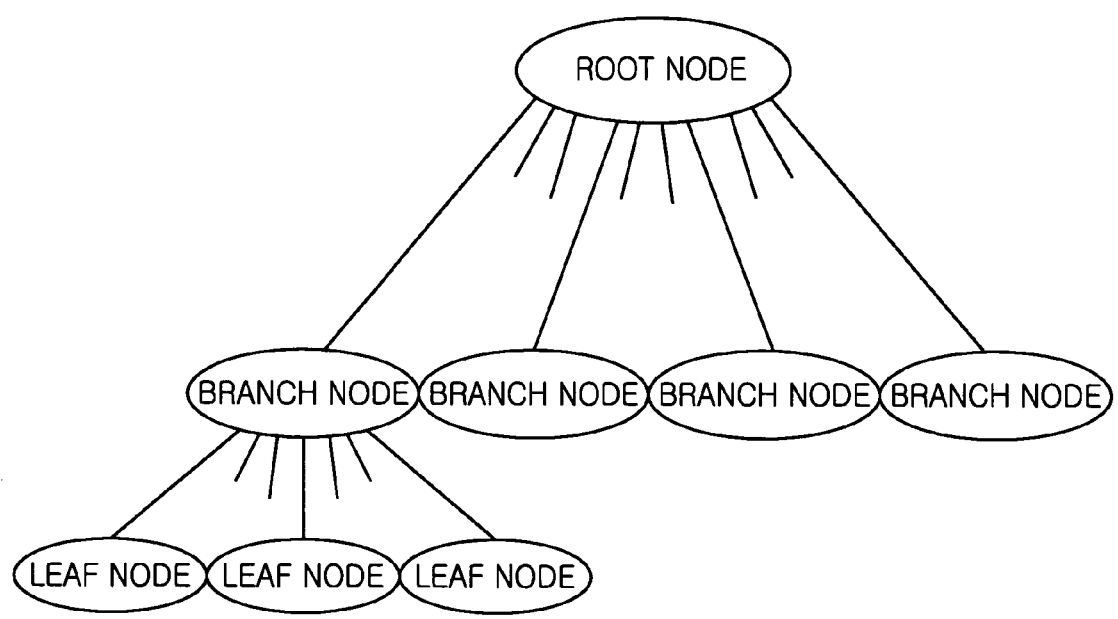
FIG. 6 represents a structure of a typical B-tree.
Figure 7:
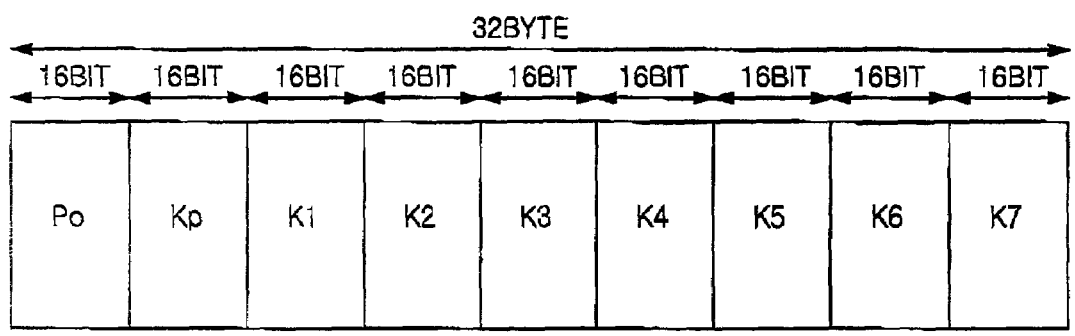
FIG. 7 describes a node structure for a search using a multiway search tree in accordance with the present invention.

FIG. 7 describes a node structure for a search using a multiway search tree in accordance with the present invention.

Each node in the multiway search tree includes key (number) information, a key pointer for indicating an address of a first key among a plurality of keys, and a node pointer for indicating an address of a first child node among a plurality of child nodes.

Referring to FIG. 7, there is provided a node configuration constituting an 8-way search tree by applying a node structure to a B-tree. That is, one node is composed of 32 bytes and includes 7 numbers of keys K1 to K7, one node pointer Po and a key pointer Kp so that the node is coincident with 32 bytes of a cache line. Herein, each of keys is composed of 32 bits and each pointer is made of 16 bits.

For example, "Kp=10000" means that the address of the memory storing the first key value K1 is '10000', the key values of K2 through K7 are located at continuous address after '10000'.

"Po=20000" means that an address of a first child node of the corresponding node is '20000'. In this embodiment, because of the 8-way search, the second to the eighth nodes have continuous memory addresses. Offsets between the addresses of the node pointers or offsets between the key pointers are well known to ordinary one skilled in the art, and therefore, for only easy description, in this specification, detailed description of them will be skipped.

The key pointer Kp is a pointer representing to the first key of the node. In case of a child node, the key pointer represents information for a corresponding port number when a value of the child node is coincident with a key value. In case of no child node, the key pointer depicts region information capable of implementing the longest prefix match.

Figure 8:
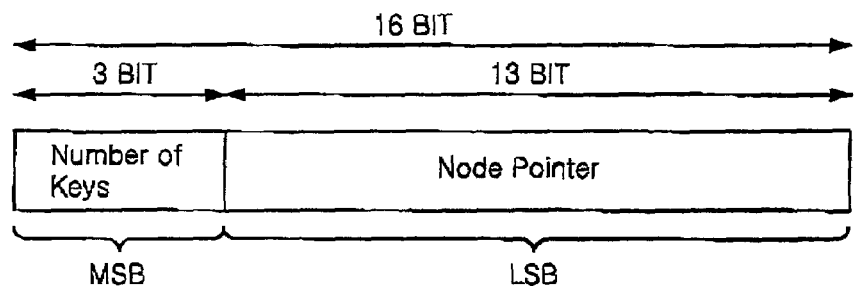
FIG. 8 shows a structure of the node pointer in FIG. 7.

In FIG. 8, there is shown a structure of the node pointer in FIG. 7.

Referring to FIG. 8, the node pointer Po includes both of the number of keys and information for the node pointer. A three(3)-bit most significant bit (MSB) of the node pointer represents the number of keys included in the node and a 13-bit least significant bit (LSB) acts as a pointer reporting a location of a lower level of the tree. Herein, if all values of the node pointer are "1", the node presents a leaf nodes On the other hand, if all values of the node pointer are not "1", the node depicts either a root node or a child node, and is used as a pointer for searching a next node.

For example, in case all values of the LSB in the node pointer are '1', it means that the node is the leaf node, and therefore, any more search is not necessary. On the other hand, in case the LSB in the node pointer is '0000111100001', it means that the node is not leaf node and the address of the node to be searched next is '0000111100001'.

Figure 9A:
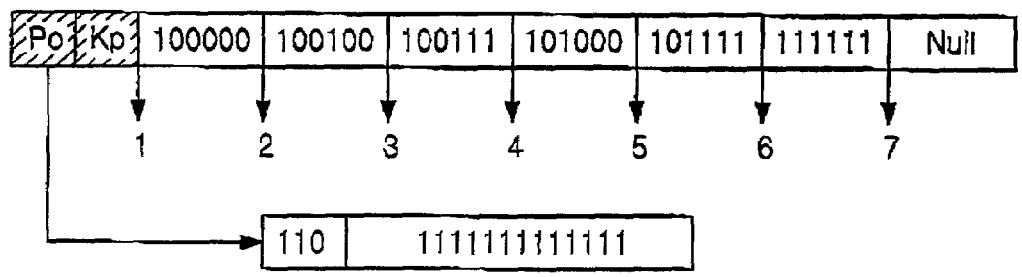
FIGS. 9A and 9B present a search tree adapted to the search using the multiway search tree in accordance with the present invention.
Figure 9B:
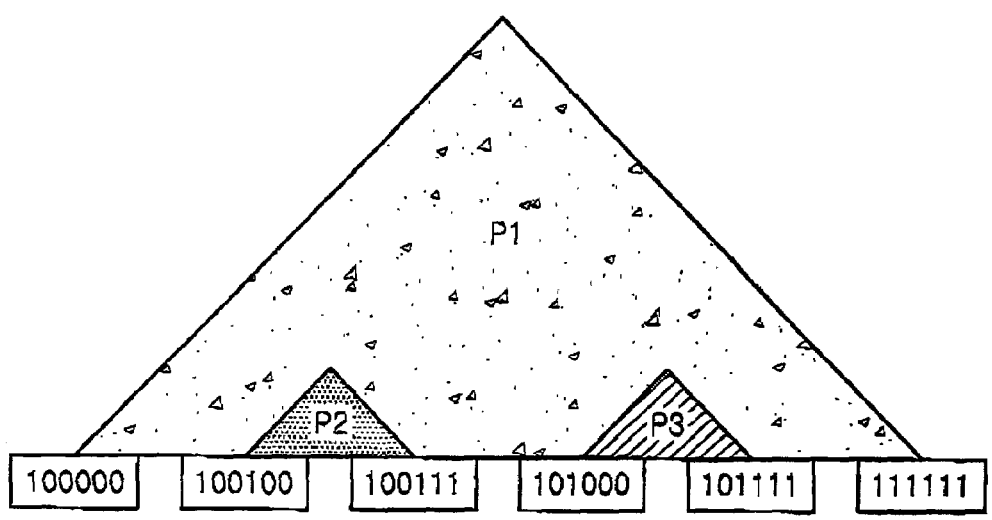

Referring to FIGS. 9A and 9B, there are illustrated search trees adapted to a search using the multiway search tree in accordance with the present invention.

FIG. 9A shows an example of a 7-way search tree.

Referring to FIG. 9A, a value of the MSB of the node pointer Po is '110', which means that the number of keys is 6. A value of the LSB is '1111111111111', which means that the node is a leaf node.

Referring to FIG. 9A, the MSB and the LSB of the node pointer Po are '110' and '110000', which mean that the number of the keys is 6 and the node is the leaf node.

Assuming that the 7-way search tree is composed of 3 numbers of prefixes such as 1*, 1001* and 10100*, 6 numbers of keys included in a corresponding range are generated by utilizing the 3 numbers of prefixes as a reference. Herein, the 6 numbers of keys are 1* to 100000, 111111, 1001* to 100100, 100111, and 10100* to 101000, 101111.

For example, if the packet of which the IP address is '110000' is received, an inputted IP address is not coincident with the key and corresponds to the sixth key pointer between '101111' and '111111'. Therefore, A corresponding key pointer is found out by using an equation (1), and then, IP port number can be obtained based on the key point.

Corresponding Key Pointer=Key Pointer $Kp$+(Number of Bits Assigned to Key×Location of Packet)   Eq. (1)

On the contrary, if the address of the inputted IP is coincident with the key, the corresponding key pointer can be obtained based on the Kp and the location of the packet.

In FIG. 9B, there is provided a structure of a tree generated by using 6 keys as references. Since the structure carries out the longest prefix match, a port number is assigned to each region. Accordingly, if there is found a consistent key as a result of searching from the root node to the leaf node, information for the port can be obtained. On the other hand, if there is no consistent key in the leaf node, the information for the port can be obtained from the corresponding range.

For instance, it a packet whose IP address is 110000 is arrived, the packet comes under a $6^{th}$ key pointer between 101111 and 111111, the address of the packet is located at P1 port. On the other hand, if the inputted IP address consists with the key, the key pointer is directly obtained from Kp and location information N.

Figure 10:
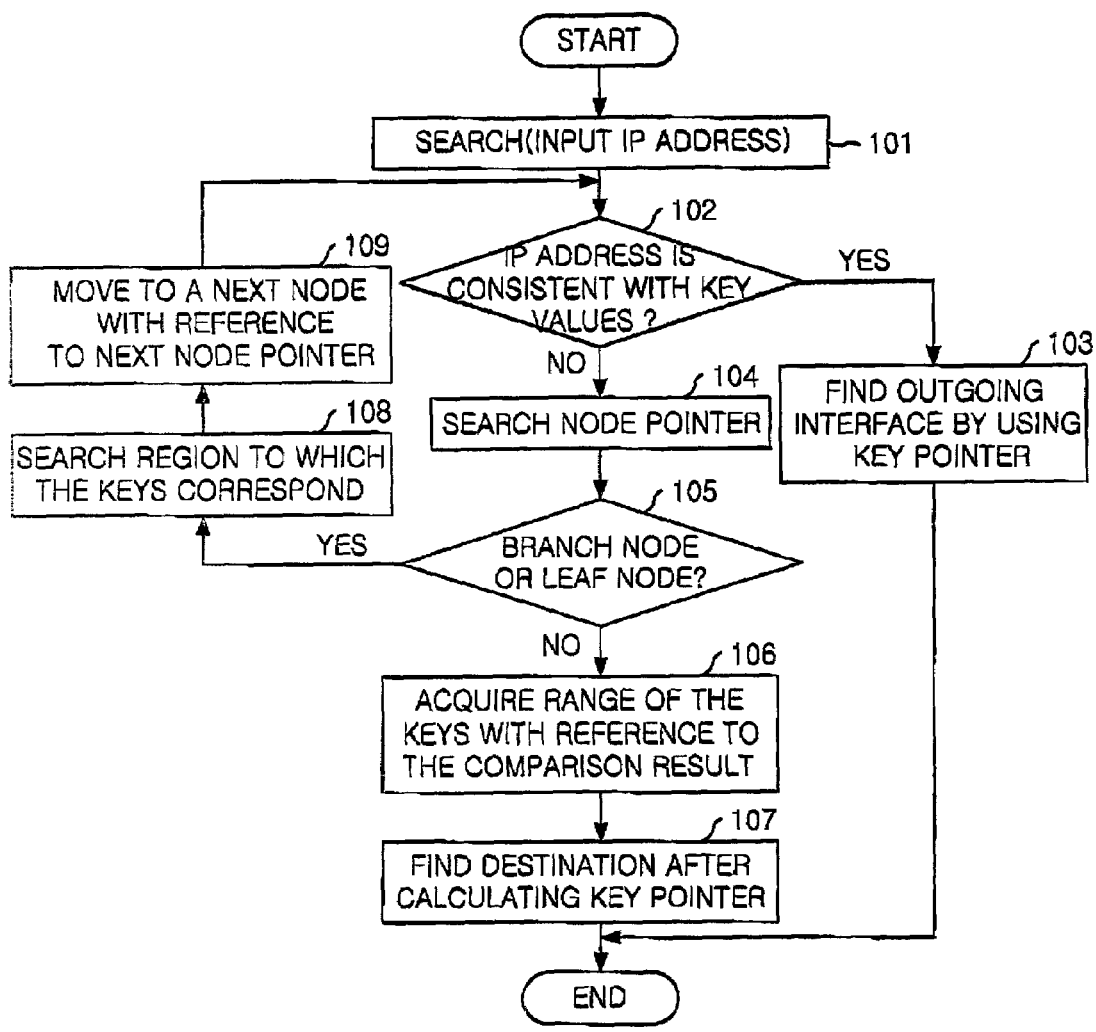
FIG. 10 exemplifies a flow chart of performing the search using the multiway search tree in accordance with the present invention.

Referring to FIG. 10, there is described a flow chart of representing a search using the multiway search tree in accordance with a preferred embodiment of the present invention.

Referring to FIG. 10, in steps 101 and 102, after reading out an 8-way node through a search operation, the IP address of the node is compared with 7 numbers of key values.

As a comparison result of step 102, if the IP address is consistent with the key values, in step 103, a destination corresponding to the IP address is found by using the key pointer obtained from the comparison result. On the other hand, if the IP address is not consistent with the key values, in step 104, a value of the node pointer is read out. In step 105, it is determined whether the node pointer corresponds to a child node or a leaf node.

As a determination result of step 105, if it is decided that the node pointer corresponds to the leaf node, in step 106, a range of the keys is acquired by referring to the above comparison result. Then, in step 107, the destination is found by calculating a key pointer.

Meanwhile, as a result of step 105, if it is determined that the node pointer corresponds to the child node, the region to which the keys correspond is searched in step 108.

In order to move to a next node, a next node pointer is computed by using its corresponding pointer and then the search process moves to the next node in step 109. After then, the comparison process of step 102 is performed and this search process is repeated until the consistent key value is found at the leaf node or the leaf node is reached.

The present invention described above can be implemented to a program capable of being stored in a computer readable recording medium such as a compact disk read only memory (CD-ROM), a random access memory (RAM), a read only memory (ROM), a floppy disc, a hard disc, an optical magnetic disc and the like.

As illustrated above, the present invention can increase the number of keys capable of being recorded on a cache line by using one pointer at a node of the multiway search tree so that the number of branches in a network address search is also increased and thus the tree depth is reduced. As a result, the present invention can accelerate the search speed and the speed of the forwarding engine.

Further, the present invention can accomplish a further speed-up by decreasing required memories and thus increasing a memory rate used in a second cache.

While the present invention has been described with respect to the particular embodiments, it will be apparent to those skilled in the art that various changes and modifications may be made without departing from the spirit and scope of the invention as defined in the following claims.

What is claimed is:

1. A method for searching a multiway search tree in which pointer information is assigned so as to accommodate related information in a cache line independent of a number of keys used in each node, the method comprising the steps of:

a) comparing an inputted Internet Protocol (IP) address with a key value;

b) if the inputted IP address is consistent with the key value, searching an outgoing interface by using a key pointer included in the node;

c) if the inputted IP address is not consistent with the key value, determining a type of the node by searching a node pointer;

d) if the node is a leaf node, searching the outgoing interface by acquiring the key pointer if the inputted IP address is consistent with the key value; and e) if the node is not the leaf node, moving to a next node with reference to the node pointer, and then repeating the steps of a) to c).

2. The method as recited in claim 1, wherein the step d) includes the steps of:
   d1) finding a key value region having the inputted IP address based on a comparison result of the step a); and
   d2) detecting the outgoing interface corresponding to the key value region.

3. The method as recited in claim 1, wherein the key value of the node is compared with the inputted IP address based on a longest prefix matching (LPM).

4. A computer readable recording medium storing instructions for executing a method for searching a multiway search tree in which pointer information is assigned so as to accommodate related information in a cache line independent of a number of keys used in each node, the method comprising the steps of:
   a) comparing an inputted IP address with a key value;
   b) if the inputted IP address is consistent with the key value, searching an outgoing interface by using a key pointer included in the node;
   c) if the inputted IP address is not consistent with the key value, determining a type of the node by searching a node pointer;
   d) if the node is a leaf node, searching the outgoing interface by acquiring the key pointer if the inputted IP address is consistent with the key value; and
   e) if the node is not the leaf node, moving to a next node with reference to the node pointer, and then repeating the steps of a) to c).

5. The computer readable recording medium as recited in claim 4, wherein the step d) includes the steps of:
   d1) finding a key value region having the inputted IP address based on a comparison result of the step a); and
   d2) detecting the outgoing interface corresponding to the key value region.

* * * * *